US006549678B1

(12) United States Patent
Gindele et al.

(10) Patent No.: US 6,549,678 B1
(45) Date of Patent: Apr. 15, 2003

(54) METHOD FOR PRESERVING SPATIAL DETAIL WHEN APPLYING A MULTIDIMENSIONAL TONAL TRANSFORM TO A DIGITAL COLOR IMAGE

(75) Inventors: Edward B. Gindele, Rochester, NY (US); Andrew Gallagher, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/240,080

(22) Filed: Jan. 29, 1999

(51) Int. Cl.[7] ............................................. G06F 15/68
(52) U.S. Cl. ....................................... 382/254; 382/162
(58) Field of Search .............................. 382/254–269, 382/162–167; 358/518–523

(56) References Cited

U.S. PATENT DOCUMENTS

| 4,275,413 A | 6/1981 | Sakamoto et al. ........... 358/525 |
| 4,500,919 A | 2/1985 | Schreiber .................... 358/518 |
| 5,012,333 A | 4/1991 | Lee et al. .................... 358/520 |
| 5,454,044 A | 9/1995 | Nakajima ..................... 382/132 |
| 5,583,666 A | 12/1996 | Ellson et al. ................ 358/518 |
| 5,694,533 A | * 12/1997 | Richards et al. ............. 395/125 |
| 5,991,494 A | * 11/1999 | Otsuka .......................... 386/37 |
| 6,167,165 A | * 12/2000 | Gallagher et al. .......... 382/263 |

FOREIGN PATENT DOCUMENTS

| EP | 0 377 386 A2 | 7/1990 | ............ H04N/1/40 |
| EP | 390055 A2 * | 10/1990 | ............ H04N/1/46 |
| EP | 0 525 949 A2 | 2/1993 | ............ G06F/15/68 |
| EP | 0 849 940 A2 | 6/1998 | ............ H04N/5/20 |
| JP | 2000-207548 * | 7/2000 | |

* cited by examiner

Primary Examiner—Thomas D. Lee
Assistant Examiner—Stephen Brinich
(74) Attorney, Agent, or Firm—David M. Woods

(57) ABSTRACT

A method for adjusting the color and tonal characteristics of a digital image, the method comprises receiving a digital image having two or more digital image channels; (b) separating each digital image channel into two signals; (c) modifying one of the signals with a multidimensional transform for adjusting the color and tonal characteristics of the digital image; and (d) combining the output of (c) with the remaining signal for producing an enhanced digital image.

43 Claims, 4 Drawing Sheets

METHOD FOR PRESERVING SPATIAL DETAIL WHEN APPLYING A MULTIDIMENSIONAL TONAL TRANSFORM TO A DIGITAL COLOR IMAGE

CROSS-REFERENCE TO RELATED APPLICATIONS

The present application is related to U.S. application Ser. No. 09/091,848, filed Sep. 30 1998, by, Andrew Gallagher, and entitled, "A METHOD FOR PRESERVING IMAGE DETAIL WHEN ADJUSTING THE CONTRAST OF A DIGITAL IMAGE".

FIELD OF THE INVENTION

The invention relates generally to the field of image processing, and more particularly, to adjusting a method for adjusting the tone scale of a digital image.

BACKGROUND OF THE INVENTION

Existing methods for modifying the tone scale and color characteristics of a digital color image include applying a tone scale function to each of the color channels independently, applying the tone scale function to the neutral channel and preserving the original pixel color difference signal, or applying the tone scale function to the low frequency image. In addition, a 3 dimensional look-up-table (3 D LUT) may be applied to the digital color image in order to modify the color or tone scale of the digital color image. All of these methods of tone scale application alter the sharpness of the detail of the modified image, and the latter can produce displeasing artifacts.

Traditional methods of applying a tone scale function to a digital color image modify the apparent sharpness of the image because the tone scale modifies the amplitudes of high frequency detail information. This phenomenon occurs when the tone scale function is applied to each of the color channels independently, or when the tone scale function is applied to the neutral channel and original pixel color difference signals are preserved.

In an effort to apply a tone scale function to a digital image without distorting the detail information, in U.S. Pat. No. 5,012,333 Lee et al. proposed separating the image into a high frequency and a low frequency image by using FIR filters. The tone scale function is then applied to only the low frequency image, and the high frequency image is added back to the tone scaled low frequency image.

Also, in U.S. Pat. No. 5,454,044 Nakajima suggests modifying the image contrast by the formula $$Sproc = Sorg + f(Sus).$$

The low frequency image (Sus) is passed through function f( ) which is a monotonically decreasing function. This signal is added to the original (Sorg) to create the processed image Sproc.

Both of these methods preserve the high frequencies of the image, but this may lead to the creation of unsharp mask type artifacts (overshoot and undershoot) in the neighborhood of large edges (characteristic of occlusion boundaries or dark shadows).

There exist in the prior art methods to modify the color and tone of a digital color image with a 3 D LUT. For example, the modification of a digital image by a 3 D LUT is described in U.S. Pat. No. 4,500,919. However, this method also modifies the appearance of detail in the processed digital image. None of the methods described in the prior art address the need for detail preservation when modifying the color and tonal characteristics of a digital color image with the use of a multidimensional look-up-table.

Thus there exists a need for a method to allow the application of a multidimensional look-up-table to a digital image to adjust the macro contrast of the image and modify the color characteristics of the image, while preserving detail information, without introducing artifacts in the neighborhood of large intensity transitions.

SUMMARY OF THE INVENTION

The present invention is directed to overcoming one or more of the problems set forth above. Briefly summarized, according to one aspect of the present invention, the invention resides in a method for adjusting the color and tonal characteristics of a digital image, the method comprising: (a) receiving a digital image having two or more digital image channels; (b) separating each digital image channel into two signals; (c) modifying one of the signals with a multidimensional transform for adjusting the color and tonal characteristics of the digital image; and (d) combining the output of (c) with the remaining signal for producing an enhanced digital image.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages of permitting the application of a multidimensional look-up-table to a digital image to adjust the macro contrast of the image and modify the color characteristics of the image, while preserving detail information, without introducing artifacts in the neighborhood of large intensity transitions.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, a computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

It is also instructive to note that the present invention will utilize a digital image of size 1024 pixels by 1536 pixels, although those skilled in the art will recognize that digital images of different dimensions may be used with equal success.

Figure 1:
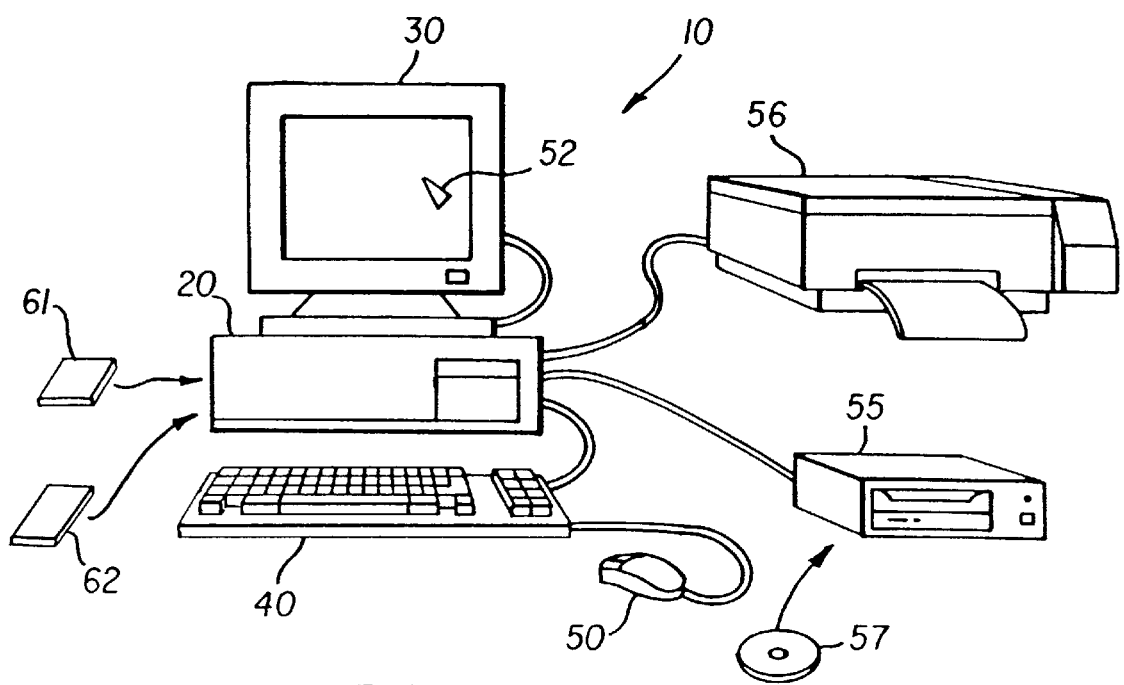
FIG. 1 is a perspective view of a computer system for implementing the present invention.

Referring to FIG. 1, there is illustrated a computer system 1 for implementing the present invention. Although the computer system 1 is shown for the purpose of illustrating a preferred embodiment, the present invention is not limited to the computer system 1 shown, but may be used on any electronic processing system. The computer system 1 includes a microprocessor-based unit 2 for receiving and processing software programs and for performing other processing functions. A display 3 is electrically connected to the microprocessor-based unit 2 for displaying user-related information associated with the software. A keyboard 4a is also connected to the microprocessor based unit 2 for permitting a user to input information to the software. As an alternative to using the keyboard 4a for input, a mouse 4b may be used for moving a selector 5 on the display 3 and for selecting an item on which the selector 5 overlays, as is well known in the art.

A compact disk-read only memory (CD-ROM) 6 is connected to the microprocessor based unit 2 for receiving software programs and for providing a means of inputting the software programs and other information to the microprocessor based unit 2 via a compact disk 7a, which typically includes a software program. In addition, a floppy disk 7b may also include a software program, and is inserted into the microprocessor-based unit 2 for inputting the software program. Still further, the microprocessor-based unit 2 may be programmed, as is well know in the art, for storing the software program internally. A printer 8 is connected to the microprocessor-based unit 2 for printing a hardcopy of the output of the computer system 1.

Images may also be displayed on the display 3 via a personal computer card (PC card) 7c or, as it was formerly known, a personal computer memory card international association card (PCMCIA card) which contains digitized images electronically embodied in the card 7c. The PC card 7c is ultimately inserted into the microprocessor based unit 2 for permitting visual display of the image on the display 3.

Figure 2:
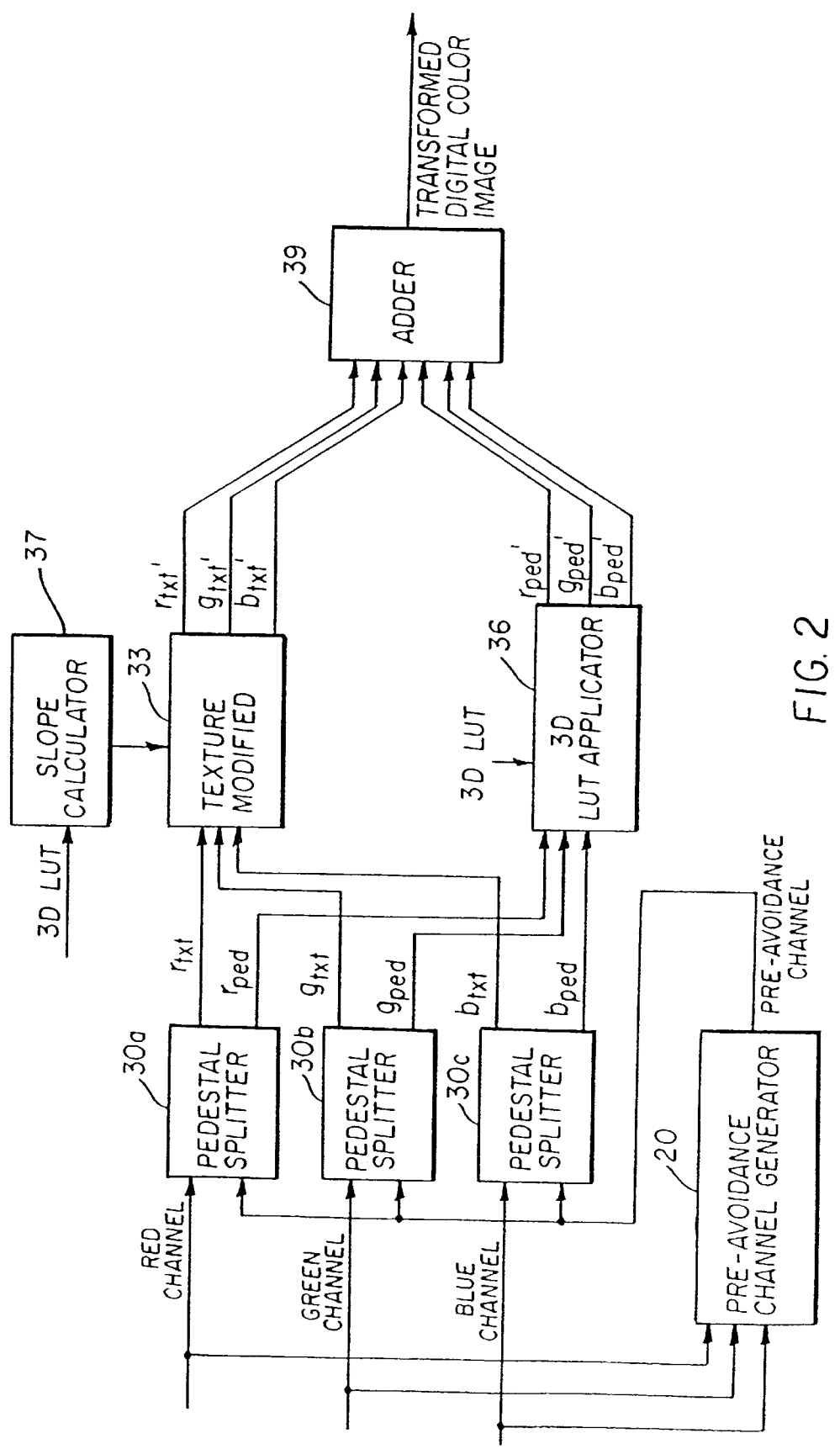
FIG. 2 is a block diagram illustrating an overview of the present invention.

Referring to FIG. 2, there is illustrated an overview of the present invention. In this regard, the input digital image consists of several input channels. These channels are typically the red, green, and blue image channels, and they are typically each referred to as color channels. Each channel of the input digital image is respectively passed as an input to one of a plurality of pedestal splitters 30. It is instructive to note that each color channel is passed to a different pedestal splitter 30. For example, the red color channel is passed to the pedestal splitter 30a. The digital image is also passed to a pre-avoidance channel generator 20, which generates a pre-avoidance channel that is also passed to each pedestal splitter 30. In the preferred embodiment in which there are three color channels, the pre-avoidance channel for each of the pedestal splitters 30 is equal to a linear combination of all the digital image channels representing the image. In this regard, the pre-avoidance channel is calculated as follows:

$$pac(x,y)=0.3\ red(x,y)+0.6 green(x,y)+0.1\ blue\ (x,y) \quad \text{Eq. 1}$$

where pac(x,y) represents the intensity of the pre-avoidance channel at the $x^{th}\ y^{th}$ pixel location, red(x,y) represents the intensity of the red channel at the $x^{th}\ y^{th}$ pixel location, green(x,y) represents the intensity of the green channel at the $x^{th}\ y^{th}$ pixel location, and blue(x,y) represents the intensity of the blue channel at the $x^{th}\ y^{th}$ pixel location.

Those skilled in the art will recognize that different pre-avoidance channel signals may be used. As an alternative embodiment, the pre-avoidance channel may be equal to any one of the three color image channels of the digital image. As a further alternative embodiment, the pre-avoidance channel need not be equal for each of the pedestal splitters 30a, 30b, and 30c.

Each color channel of the digital image channel is divided into two portions by a pedestal splitter 30—a pedestal signal and a texture signal, as will be described in detail below. The pedestal signal is a smooth representation of a digital image channel except for large transition edges occurring in the neighborhood of large transition edges in the digital image channel.

The present invention operates by applying a multidimensional transformation to a collection of pedestal signals. One example of a multidimensional transformation is a 3D LUT. Another example of a multidimensional transformation is a set of multivariate equations. The application of a 3D LUT is similar to evaluating three equations to determine modified red, green, and blue signals. For example, the output red value may be expressed as:

$$r'=f_r(r,g,b)$$

where r' represents the modified red signal, $f_r(r,g,b)$ represents a function of the red, green, and blue channel values used to determine the modified red signal, and r, g, and b represent the red, green, and blue channels respectively. A similar operation may be performed to obtain the modified green and blue signals. The 3D LUT or the set of equations, one per color channel, that are a function of more than one color signal shall be referred to as a multi-dimensional transform.

A three dimensional look up table (3D LUT) is applied to the collection of pedestal signals output from the pedestal splitters 30 by the 3D LUT applicator 36 in order to modify the color characteristics and tone scale of the digital image for image enhancement or preparation for an output device. A 3D LUT outputs three values for three input values. Typically a 3D LUT is a function of three variables where the three input variables are the red, green, and blue intensities and the three output values are transformed red, green and blue pixel values. By applying this 3D LUT to every pixel of the digital color image, the tone scale and color characteristics of the digital color image are transformed. The purpose of applying a 3D LUT to an image is to allow non-linear modifications to the color and tonal characteristics of the digital image.

Thus, the output of the 3D LUT applicator 36 is a collection of modified pedestal signals. A 3D LUT applicator 36 is implemented by any technique as is well known in the art. U.S. Pat. No. 4,500,919 describes a generalized method of constructing and applying a 3D-LUT to a digital color image. The 3D-LUT consists of a table of three output values (red, green, and blue) corresponding to three input values (red, green, and blue). The range of input values is typically chosen to span the full extent of numerical input pixel values. The output values are chosen to achieve the desired color and tone scale modifications. U.S. Pat. No. 5,583,666 describes a method for populating a 3D LUT to achieve a tone scale modification. Since a table representing all possible combinations of red, green, and blue pixel input values can consume a large amount of computer memory, most 3D LUT applications sparsely sample the range of input pixel values. For these applications, the input pixel values will not always exactly correspond to one of the 3D LUT table entries. Thus an interpolation scheme is typically employed which provides approximate output values by interpolating several of the 3D LUT table entries. A variety of 3D LUT interpolation methods exist, e.g. nearest neighbor, tri-linear, tetrahedral are all different interpolation methods. U.S. Pat. No. 4,275,413 describes the tetrahedral interpolation method. The present invention may be used with any of the methods of interpolation.

The texture signal of each digital image channel may be amplified by the texture modifier 33 if desired, or altered in some other manner as those skilled in the art may desire. The texture modifier 33 operates independently on the red texture signal, the green texture signal, and the blue texture signal. This texture modifier 33 may be a multiplication of the texture signal by a scalar constant. In the preferred embodiment, the texture modifier 33 amplifies the red texture signal, the green texture signal, and the blue texture signal by a scalar constant determined by the slope calculator 37. The purpose of the slope calculator 37 is to estimate the midtone gain of the 3D LUT. This may be accomplished by evaluating the following equation:

$$m = \frac{D[f_3(p_1), f_3(p_2)]}{D[p_1, p_2]}$$

where D[x,y] indicates the Euclidian distance measured between point x and point y in a 3 dimensional space, $f_3(x)$ indicated the output of the 3D LUT for the input point x. The calculation of the Euclidian distance is well known by those skilled in the art and will not be further explained. Points $p_1$ and $p_2$ represent the coordinates of two points in the midtone range appropriate for the image data. In the preferred embodiment, $p_1$=(1200, 1200, 1200) and $p_2$=(1800, 1800, 1800). The texture modifier 33 outputs three signals: a modified red texture signal, a modified green texture signal, and a modified blue texture signal. In the preferred embodiment, the modified red texture signal may be calculated with the expression:

$$r'_{txt} = m * r_{txt}$$

where $r'_{txt}$ represents the modified red texture signal, m represents the scalar constant determined by the slope calculator 37, and $r_{txt}$ represents the red texture signal input to the texture modifier 33. The modified green and blue texture signals are calculated in a similar manner, dependent only upon the green and blue texture signals input to the texture modifier 33, respectively.

The modified texture signals and the modified pedestal signals are then summed together by an adder 39, forming a transformed digital image. The addition is preformed on each of the red, green, and blue channels independently. The red channel of the transformed digital image is formed by calculation of the following formula:

$$R' = r'_{txt} + r'_{ped}$$

Where R' represents the red channel of the transformed digital image, $r'_{txt}$ represents the modified red texture signal output from the texture modifier 33, and $r'_{ped}$ represents the modified red pedestal signal output from the 3D LUT applicator 36. In a similar manner the green and blue channels of the transformed digital image are computed by the following formulas: $G' = g'_{txt} + g'_{ped}$ and $B' = b'_{txt} + b'_{ped}$ respectively.

Figure 3:
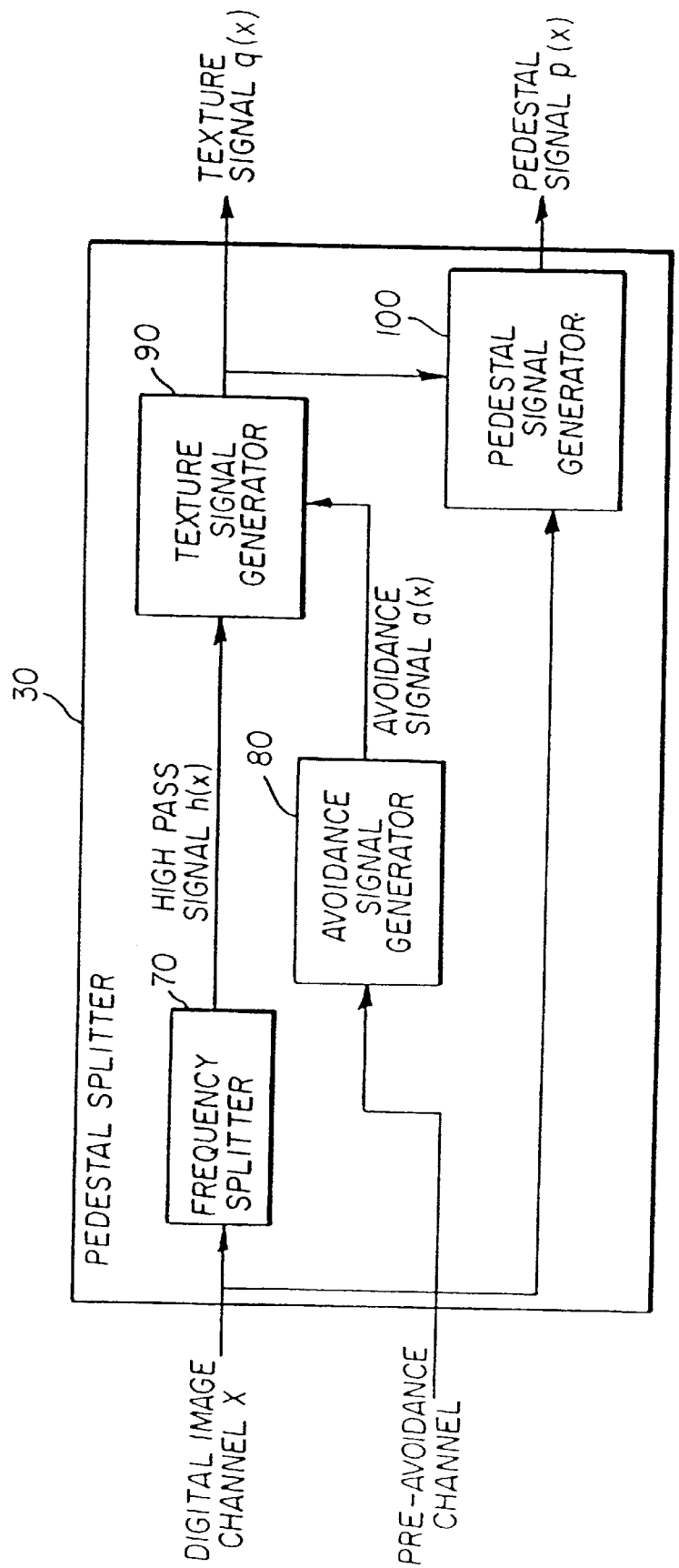
FIG. 3 is an exploded view of the pedestal splitter of FIG. 1.

Referring to FIG. 3, the digital image channel input into the pedestal splitter 30 is split into a high pass signal and a low pass signal by a frequency splitter 70. The spatial filtering operation preformed by the frequency splitter 70 is preferably with a Finite Impulse Response (FIR) Gaussian filter having a width of 2.5 pixels. The preferred value of the standard deviation of the Gaussian filter may vary with image size. The value of 2.5 pixels for the sigma value was derived by optimizing the present invention with 1024 by 1536 pixel size images. This Gaussian filter is a two-dimensional, lowpass filter whose filter coefficients may be derived by the following formula which is well known in the art:

$$G(i,j) = 1/(\text{sigma sqrt}(2\pi)) \exp[-(i^2+j^2)/(2 \text{ sigma}^2)]$$

where
   $G(i,j)$=the Gaussian filter coefficient at the $(i,j)^{th}$ pixel
   sigma=the standard deviation of the Gaussian filter (2.5)
   $\pi$=the constant approximately 3.1415 . . .

Spatial filtering an image channel with a digital filter ( referred to in the art as two dimensional convolution) is well known in the art. A spatial filtering operation may be represented by the following expression:

$$y(m, n) = \sum_{i,j} a_{i,j} x(m-i, n-j)$$

where y(m,n) represents the value of the signal output by the spatial filtering operation at location (m,n), x(m,n) represents the value of the signal input to the spatial filtering operation at location (m,n), and $a_{i,j}$ represents the coefficients of the spatial filter. In the preferred embodiment, $a_{i,j}$ is set equal to $G(i,j)$. Spatial filtering of a signal by a Gaussian filter generates a lowpass signal. The lowpass signal output from the frequency splitter 70 is input into an avoidance signal generator 80 for forming an avoidance signal, as will be described in detail below. A texture signal generator 90 receives both the high pass signal and the avoidance signal and both signals are multiplied therein for producing a texture signal.

The pedestal generator 100 receives the original digital image channel and the texture signal and subtracts the texture signal from the digital image channel, which produces a pedestal signal.

Figure 4:
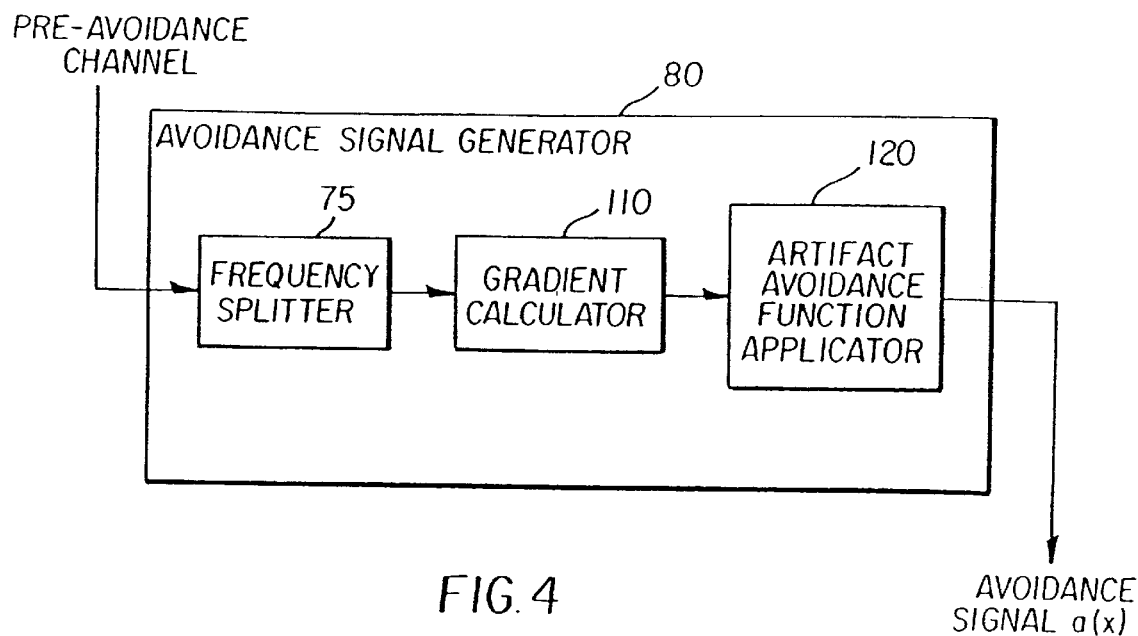
FIG. 4 is an exploded view of the avoidance signal generator of FIG. 2.

Referring to FIG. 4, there is illustrated an exploded block diagram of the avoidance signal generator 80. In this regard, the pre-avoidance channel is input into a frequency splitter 75 in order to generate a lowpass signal; the operation of a frequency splitter is described above. In the preferred embodiment, the standard deviation of the spatial filter used in this frequency splitter 75 is equal to the standard deviation of the spatial filter of the frequency splitter 70 (sigma=2.5 pixels.) However, those skilled in the art will recognize that this condition is not a requirement. The lowpass signal output from the frequency splitter 75 is input to the non-directional squared gradient calculator 110 for producing a non-directional squared gradient signal. This calculation is performed by first calculating the difference between the pixel and its upper vertical neighbor, as well as the difference between the pixel and its horizontal neighbor to the right. The non-directional squared gradient is the sum of the squares of these two differences. The non-directional squared gradient signal is then mapped by an artifact avoidance function applicator 120 to produce an artifact avoidance signal.

Figure 5:
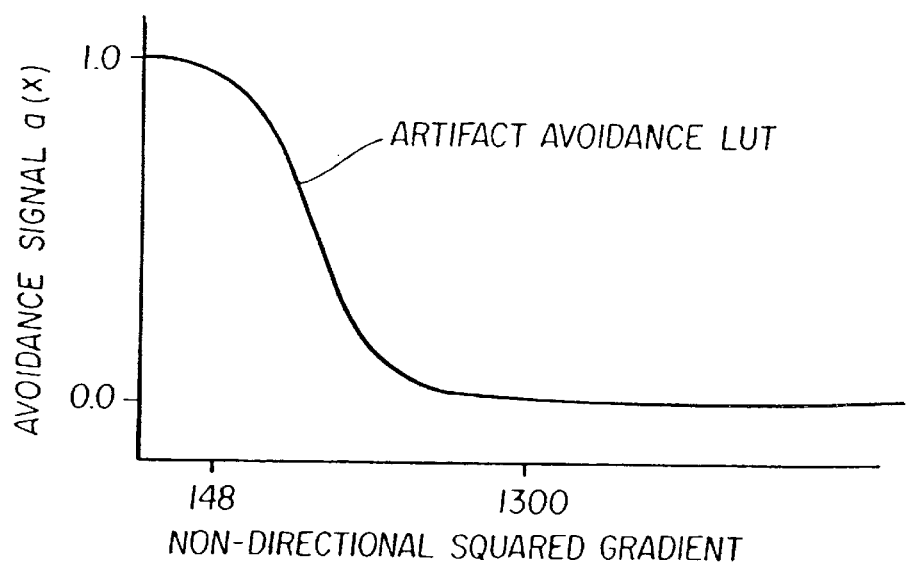
FIG. 5 is an example of an artifact avoidance LUT.

Referring to FIG. 5, this mapping function is performed by passing the non-directional squared gradient value through an artifact avoidance LUT formed in the following manner. For non-directional squared gradient values less than or equal to constant $K_1$, then the artifact avoidance signal returned is 1.0. For non-directional squared gradient values greater than $K_1$ but less than constant $K_2$, the artifact avoidance signal returned is equal to:

$$\tfrac{1}{2}*(1+\mathrm{COS}(\pi*(\text{non-directional squared gradient}-K_1)/(K_2-K_1))).$$

For non-directional squared gradient values greater than $K_2$, the artifact avoidance signal returned by the LUT is equal to 0.0. The constants $K_1$ and $K_2$ are dependent upon the data type of the digital image. The present invention utilizes digital images with a 12 bit description of each digital image channel at each pixel location. In the preferred embodiment, $K_1=148$ and $K_2=1300$. Alternatively, this mapping function may be performed by mapping the non-directional squared gradient value through any monotonically decreasing LUT ranging from 1.0 to 0.0 with increasing non-directional squared gradient. The artifact avoidance signal output from the artifact signal generator 80 is an example of a control signal that is used to modulate the highpass signal output from the frequency splitter 70 in order to generate the texture signal output from the texture signal generator 90.

The invention has been described with reference to a preferred embodiment. However, it will be appreciated that variations and modifications can be effected by a person of ordinary skill in the art without departing from the scope of the invention. For instance, in the preferred embodiment, the 3D LUT anticipated inputs of the red, green, and blue signals. However, a 3D LUT may be devised which anticipates inputs of a single luminance signal and two chrominance signals. Those skilled in the art will realize that with a small amount of obvious modification, the present invention may be utilized in the described situation.

What is claimed is:

1. A method for adjusting the color and tonal characteristics of a digital image, the method comprising the steps of:
   (a) receiving a digital image having two or more digital image channels wherein each digital image channel relates to a different color;
   (b) using a spatial filter for separating each digital image channel into two signals, thereby producing a plurality of pairs of first and second signals, one pair for each digital image channel;
   (c) using the first signal from each pair and a multidimensional transform for adjusting the color and tonal characteristics of the digital image to produce a modified first signal for each digital image channel; and
   (d) combining the modified first signal of each digital image channel with the corresponding second signal derived from the same digital image channel for producing an enhanced digital image channel.

2. The method as in claim 1, wherein step (b) includes using a control signal for separating each digital image channel into two signals.

3. The method as in claim 2 further comprising creating the control signal from a spatially filtered version of the digital image.

4. The method as in claim 1, wherein step (c) further comprises using a 3 dimensional look-up-table as the multidimensional transform.

5. The method as in claim 2, wherein step (c) further comprises using a 3 dimensional look-up-table as the multidimensional transform.

6. The method as in claim 3, wherein step (c) further comprises using a 3 dimensional look-up-table as the multidimensional transform.

7. The method as in claim 6 further comprising the step of modifying the remaining signal before step (d).

8. A system for adjusting the color and tonal characteristics of a digital image, the system comprising:
   (a) means for receiving a digital image having two or more digital image channels wherein each digital image channel relates to a different color;
   (b) a spatial filter for separating each digital image channel into two signals, thereby producing a plurality of pairs of first and second signals, one pair for each digital image channel;
   (c) means for using the first signal from each pair and a multidimensional transform for adjusting the color and tonal characteristics of the digital image to produce a modified first signal for each digital image channel; and
   (d) means for combining the modified first signal of each digital image channel with the corresponding second signal derived from the same digital image channel for producing an enhanced digital image channel.

9. The system as in claim 8, wherein step (b) includes using a control signal for separating each digital image channel into two signals.

10. The system as in claim 9 further comprising creating the control signal from a spatially filtered version of the digital image.

11. The system as in claim 8, wherein the modifying means further comprises using a 3 dimensional look-up-table as the multidimensional transform.

12. The system as in claim 9, wherein the modifying means further comprises using a 3 dimensional look-up-table as the multidimensional transform.

13. The system as in claim 10, wherein the modifying means further comprises using a 3 dimensional look-up-table as the multidimensional transform.

14. The system as in claim 13 further comprising the step of modifying the remaining signal before combining the two signals.

15. A computer program product for adjusting the color and tonal characteristics of a digital image comprising: a computer readable storage medium having a program stored thereon for performing the steps of:
   (a) receiving a digital image having two or more digital image channels wherein each digital image channel relates to a different color;
   (b) using a spatial filter for separating each digital image channel into two signals, thereby producing a plurality of pairs of first and second signals, one pair for each digital image channel;
   (c) using the first signal from each pair and a multidimensional transform for adjusting the color and tonal characteristics of the digital image to produce a modified first signal for each digital image channel; and
   (d) combining the modified first signal of each digital image channel with the corresponding second signal derived from the same digital image channel for producing an enhanced digital image channel.

16. The computer program product as in claim 15, wherein step (b) includes using a control signal for separating each digital image channel into two signals.

17. The computer program product as in claim 16 further comprising creating the control signal from a spatially filtered version of the digital image.

18. The computer program product as in claim 15, wherein step (c) further comprises using a 3 dimensional look-up-table as the multidimensional transform.

19. The computer program product as in claim 16, wherein step (c) further comprises using a 3 dimensional look-up-table as the multidimensional transform.

20. The computer program product as in claim 17, wherein step (c) further comprises using a 3 dimensional look-up-table as the multidimensional transform.

21. The computer program product as in claim 20 further comprising modifying the remaining signal before step (d).

22. A method for adjusting the color and tonal characteristics of a digital image, the method comprising the steps of:
  (a) receiving a digital image having two or more digital image channels;
  (b) separating each digital image channel into first and second signals, thereby producing a plurality of pairs of first and second signals, one pair for each digital image channel, wherein the second signal of each pair is generated by subtracting the first signal from the respective digital image channel;
  (c) modifying one of the signals of each pair with a multidimensional transform for adjusting the color and tonal characteristics of the digital image; and
  (d) combining an output of step (c) with the remaining signal of each pair for producing an enhanced digital image.

23. The method as in claim 22, wherein step (b) includes using a spatial filter for separating each digital image channel into the first and second signals.

24. The method as in claim 22, wherein step (b) includes using a control signal for separating each digital image channel into the first and second signals.

25. The method as in claim 24 further comprising creating the control signal from a spatially filtered version of the digital image.

26. The method as in claim 22, wherein step (c) further comprises using a 3 dimensional look-up-table as the multidimensional transform.

27. The method as in claim 22 further comprising the step of modifying the remaining signal before step (d).

28. A system for adjusting the color and tonal characteristics of a digital image, the system comprising:
  (a) means for receiving a digital image having two or more digital image channels;
  (b) means for separating each digital image channel into first and second signals, thereby producing a plurality of pairs of first and second signals, one pair for each digital image channel, wherein the second signal is generated by subtracting the first signal from the respective digital image channel;
  (c) means for modifying one of the signals of each pair with a multidimensional transform for adjusting the color and tonal characteristics of the digital image; and
  (d) means for combining an output of the modifying means with the remaining signal of each pair for producing an enhanced digital image.

29. The system as in claim 28, wherein the separating means includes a spatial filter for separating each digital image channel into the first and second signals.

30. The system as in claim 28, wherein step (b) includes using a control signal for separating each digital image channel into the first and second signals.

31. The system as in claim 30 further comprising creating the control signal from a spatially filtered version of the digital image.

32. The system as in claim 28, wherein the modifying means further comprises using a 3 dimensional look-up-table as the multidimensional transform.

33. The system as in claim 28 further comprising the step of modifying the remaining signal before combining the two signals.

34. A computer program product for adjusting the color and tonal characteristics of a digital image comprising: a computer readable storage medium having a program stored thereon for performing the steps of:
  (a) receiving a digital image having two or more digital image channels;
  (b) separating each digital image channel into first and second signals, thereby producing a plurality of pairs of first and second signals, one pair for each digital image channel, wherein the second signal is generated by subtracting the first signal from the respective digital image channel;
  (c) modifying one of the signals of each pair with a multidimensional transform for adjusting the color and tonal characteristics of the digital image; and
  (d) combining an output of step (c) with the remaining signal of each pair for producing an enhanced digital image.

35. The computer program product as in claim 34, wherein step (b) includes using a spatial filter for separating each digital image channel into the first and second signals.

36. The computer program product as in claim 34, wherein step (b) includes using a control signal for separating each digital image channel into the first and second signals.

37. The computer program product as in claim 36 further comprising creating the control signal from a spatially filtered version of the digital image.

38. The computer program product as in claim 34, wherein step (c) further comprises using a 3 dimensional look-up-table as the multidimensional transform.

39. The computer program product as in claim 34 further comprising modifying the remaining signal before step (d).

40. A method for adjusting the color and tonal characteristics of a digital image, the method comprising the steps of:
  (a) receiving a digital image having two or more digital image channels;
  (b) separating each digital image channel into first and second signals, whereby the first signal is a processed signal obtained by using a control signal derived from one or more of the digital image channels and the second signal is generated by subtracting the processed signal from the digital image channel;
  (c) modifying the second signal with a multidimensional transform for adjusting the color and tonal characteristics of the digital image; and
  (d) combining an output of step (c) with the remaining signal for producing an enhanced digital image.

41. The method as in claim 40 further comprising creating the control signal from a spatially filtered version of the digital image.

42. The method as in claim 40, wherein step (c) further comprises using a 3 dimensional look-up-table as the multidimensional transform.

43. The method as in claim 40 further comprising the step of modifying the remaining signal before step (d).

* * * * *